Aug. 19, 1924.  1,505,886

J. G. HALEY

INSECT DESTROYER

Filed Feb. 28, 1923   2 Sheets-Sheet 1

Inventor
Jessie G. Haley,

Aug. 19, 1924.

J. G. HALEY 1,505,886

INSECT DESTROYER

Filed Feb. 28, 1923   2 Sheets-Sheet 2

Inventor
Jessie G. Haley,

Patented Aug. 19, 1924.

1,505,886

UNITED STATES PATENT OFFICE.

JESSIE G. HALEY, OF WELLSTON, OKLAHOMA.

INSECT DESTROYER.

Application filed February 28, 1923. Serial No. 621,898.

*To all whom it may concern:*

Be it known that I, JESSIE G. HALEY, a citizen of the United States, residing at Wellston, in the county of Lincoln and State of Oklahoma, have invented certain new and useful Improvements in Insect Destroyers, of which the following is a specification, reference being had to the accompanying drawings.

This invention relates to certain improvements in insect destroyers and has relation more particularly to a device of this general character especially designed and adapted for use in the extermination of boll weevils and the like and it is an object of the invention to provide a novel and improved machine provided with collecting means together with a mechanism for crushing the gathered insects.

Another object of the invention is to provide a novel and improved device of this general character adapted to gather or collect boll weevils or the like while lying upon the ground and which insects are caused to pass through a crushing medium.

The invention consists in the details of construction and in the combination and arrangement of the several parts of my improved insect destroyer whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1:
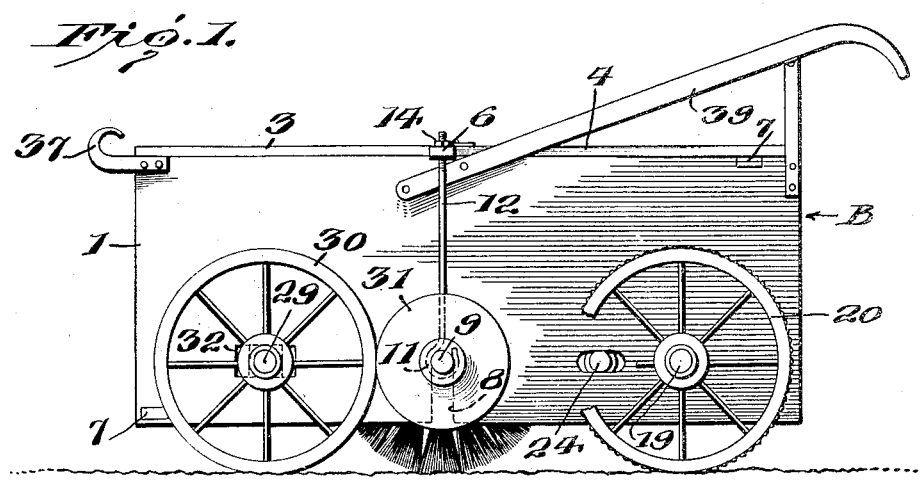
Figure 1 is a side elevational view of an insect destroyer constructed in accordance with an embodiment of my invention.
Figure 2:
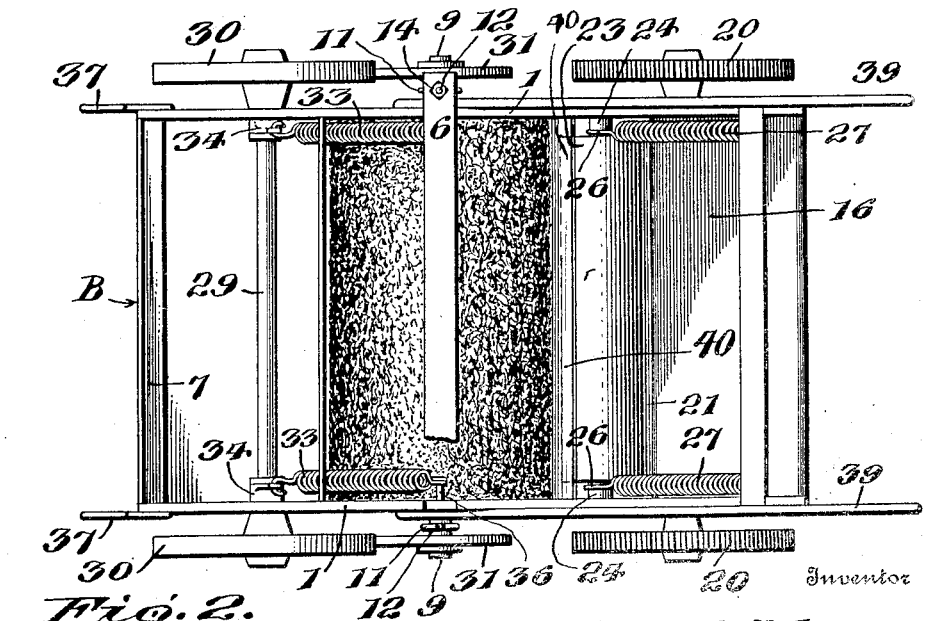
Figure 2 is a view in top plan of the structure illustrated in Figure 1 with the top wall and door removed.
Figure 3:
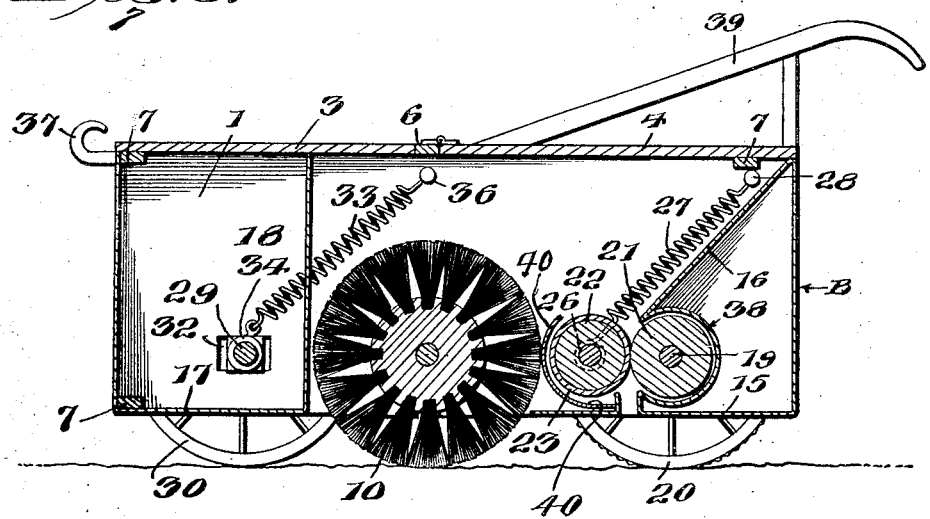
Figure 3 is a vertical sectional view taken through the device as herein disclosed.
Figure 4:
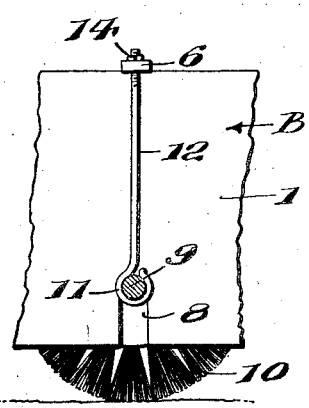
Figure 4 is a fragmentary side elevational view illustrating in detail a mounting for the brush.

As disclosed in the accompanying drawings, B denotes a body comprising the side walls 1 having one end portion of the top of said body permanently closed as at 3, while the opposite portion of the top of the body is adapted to be closed by the swinging door 4. This door 4 is hingedly connected as at 5 to the cross member or brace 6 resting upon and connected with the upper edges of the side walls 1 and extending outwardly thereof. The side walls 1 also having disposed therebetween and secured thereto the suitably positioned brace members 7.

The lower portions of the side walls 1 of the body B are provided with the vertically disposed open slots 8 aligned transversely of the body and received within said slots 8 are the outstanding spindles 9 of a roller brush 10. The spindles 9 extend outwardly of the walls 1 and engaged with each of the spindles 9 from below is a hook member 11 carried by an elongated shank 12. The shank 12 extends upwardly through an extended end portion of the brace 6. Engaged with the shank 12 above the brace 6 is the holding nut 14 having contact with the brace 6 whereby the roller brush 10 is effectively maintained in applied position.

The brush 10 when in applied position extends below the lower edges of the side walls 1 so as to have the proper contact with the ground or surface over which the machine is passing whereby the insects such as boll weevils which may fall upon such surface are picked up by the brush 10 and thrown within the body B. The brush is particularly adapted for use in connection with squares or bolls.

The lower marginal portion of the side walls 1 of the body B rearwardly of the roller brush 10 is provided with a bottom wall 15 preferably of sheet metal and which at its rear end is continued upwardly to provide the rear wall 16 for the body B. The inner or free edge of the bottom wall 15 is immediately adjacent to the roller brush 10 and has slight contact therewith. The lower marginal portions of the walls 1 in advance of the roller brush 10 are also connected by a forward bottom wall 17 terminating inwardly of the forward ends of the walls 1, the rear edge of the bottom wall 17 being continued upwardly to provide a front wall 18 for the body B.

Rotatably supported by the side walls 1 of the body B is an axle 19 terminating exteriorly of the body B and fixed to each extended portion of the axle is a wheel 20, the rim of which being preferably provided with traction lugs. Mounted upon the axle 19 and substantially snugly fitting between the walls 1 of the body B is a roller 21 preferably of hard wood. Inwardly of the roller 21 is a second roller 22 having applied to its periphery a lamination 23 of rubber or kindred yieldable material. The roller 22 is provided at its ends with the outstanding spindles 24 each of which extends within a slot 25 produced in the side walls 1 of the body B whereby the roller 22 may have movement toward or from the roller 21. Surrounding each of the spindles 24 is an annular member or ring 26 secured to an end portion of the retractible member or spring 27, the opposite end portion of the spring 27 being secured as at 28 to the adjacent side wall 1 of the body B at a point above and beyond the roller 21. The retractible members or springs 27 serve to constantly urge the roller 22 toward the roller 21 yet permits the same to move in a direction therefrom and this is of particular advantage to compensate for different sizes of squares, bolls or the like which may pass therebetween. As the squares, bolls or the like are passed between these rollers 21 and 22 the boll weevils or the like therein are crushed and this is also true of the free insects which may be gathered by the roller brush 10.

Rotatably supported by the forward portions of the side walls 1 of the body B is an axle 29 extending exteriorly of the body and fixed to said extended portions of the axle 29 are the wheels 30. The periphery of each of these wheels has frictional contact with a disc 31 fixed to the adjacent spindle 9 of the roller brush 10 so that when the machine is advancing the requisite rotation will be imparted to the brush 10. The axle 29 is disposed through slots 32 in the side walls 1 and associated with each end portion of the axle 29 is a retractible member 33 whereby the axle 29 is urged inwardly so that the wheels 30 are effectively maintained in proper frictional engagement with the discs 31.

Each of the retractible members 33 as herein disclosed has secured to one end portion thereof an annular member or ring 34 through which an end portion of the axle 29 extends, while the opposite end portion of the spring is anchored as at 36 to a side wall 1 of the body B.

The forward end portions of the side walls 1 of the body B are provided with the hook members 37 whereby a draft animal or the like may be effectively hitched to the body.

A portion of the rear wall 16 adjacent to the bottom wall 15 is disposed on a curvature as at 38 to partially surround the adjacent roller 21 at a point substantially at the vertical center thereof. The wall 16 from this curved portion 38 extends upwardly and rearwardly on a predetermined incline so that as the insects, squares or the like are thrown into contact with said rear wall 16 they will be directed by said wall to pass between the rollers 21 and 22.

Extending upwardly and rearwardly from the side walls 1 of the body B are the handle members 39 whereby the machine in operation may be readily and conveniently controlled.

Underlying the roller 22 and disposed toward the brush 10 is a plate 40. This plate 40 extends forwardly sufficient to contact with the bristles of the brush so that the same will spread and also provides means to maintain the brush 10 clean.

In practice, as the machine passes alongside of a plant row or between adjacent plant rows the resultant rotation of the brush 10 will throw the weevils or kindred insects upwardly within the body B and said brush during this rotation will also cause such collected insects to be carried rearwardly and delivered between the crushing rollers 21 and 22. While as illustrated in the drawings the machine may not possess a maximum of efficiency yet as disclosed a certain amount of the insects will be carried within the body while at the same time those that are thrown back upon the ground will be swept forwardly by the brush. While not illustrated in the drawings, an apron or deflector may be employed so as to direct the material upward. However, this in itself is not new and it is believed unnecessary that the same be disclosed in the present application as an arrangement may be employed as suggested in Patent No. 679,286 dated July 30, 1901.

From the foregoing description it is thought to be obvious that an insect destroyer constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In a machine of the character described, a hollow body having a portion of its bottom open and having its sides formed with slots extending upwardly from the bottom and other slots horizontally elongated, ground engaging wheels mounted upon the axle slidable along said second named slots, a ground engaging brush mounted on an axle mounted within said first named slots, friction disks on the brush axle bearing against the periphery of said ground engaging wheels, coil springs connected with the first named axle and with the sides of the hollow body for holding the wheels in engagement with said disks, and supporting means for the brush comprising depending rods located exteriorly of the body and terminating at their lower ends in hooks engaging the brush axle, extensions on the top of the body through which the upper ends of the rods pass, said upper ends being threaded, and nuts on said threaded ends engaging said extensions.

2. In a machine of the character described, a hollow body, rotary brush means therein for sweeping up insects, ground engaging wheels supporting the forward end of the body and having operative connection with the brush for operating the same, ground engaging wheels at the rear end of the body mounted upon an axle carrying a roller located within the body, the sides of the body being formed with horizontal slots, a second roller mounted upon an axle slidable through said slots and coacting with said first named roller, spring means connected with the axle of the second named roller for urging the same toward the first named axle, shields partly surrounding both rollers and terminating at their lower ends in spaced relation, the bottom of the body having an opening below the meeting line of the rollers for the discharge of crushed insects.

3. A machine of the class described comprising a hollow body provided with an opening in its bottom, the opposed walls of the body having open slots in their lower portions, a rotary brush arranged within the body and partially extending through the opening in the bottom of the body, said brush having spindles extending through the slots in the walls, a brace member carried by the body and extending outwardly of the walls provided with the slots, shanks operatively engaged with said extended portions of the brace member, each of said shanks being provided with a hook member engaging one of the spindles of the brush from below, whereby the shanks hold the brush in applied position, and means for rotating the brush.

4. A machine of the class described comprising a hollow body, supporting wheels therefor, a brush supported within the body and extending therebelow for contact with the surface over which the machine traverses, means whereby certain of the supporting wheels rotate said brush, a crushing medium arranged within the body, a wall within the body at the opposite side of the brush and in close proximity thereto, and a second wall positioned rearwardly of the crushing medium and immediately adjacent thereto.

5. A machine of the class described comprising a hollow body, supporting wheels therefor, a brush supported within the body and extending therebelow for contact with the surface over which the machine traverses, means whereby certain of the supporting wheels rotate said brush, a crushing medium arranged within the body, a wall within the body at the opposite side of the brush and in close proximity thereto, and a second wall positioned rearwardly of the crushing medium and immediately adjacent thereto, a portion of said last named wall being inclined with respect to the crushing medium to serve as a guide therefor.

In testimony whereof I hereunto affix my signature.

JESSIE G. HALEY.